United States Patent
Jha et al.

(10) Patent No.: US 10,701,143 B1
(45) Date of Patent: Jun. 30, 2020

(54) SERVER-ORCHESTRATED PEER-TO-PEER CONTENT SHARING IN CMS AND SYNC-N-SHARE APPLICATIONS

(71) Applicant: EMC Corporation, Hopkinton, MA (US)

(72) Inventors: Ravi R. Jha, Bangalore (IN); Jay N. Gaba, Bangalore (IN); Mallanagouda Patil, Bangalore (IN)

(73) Assignee: EMC IP Holding Company, LLC, Hopkinton, MA (US)

( * ) Notice: Subject to any disclaimer, the term of this patent is extended or adjusted under 35 U.S.C. 154(b) by 602 days.

(21) Appl. No.: 14/858,913

(22) Filed: Sep. 18, 2015

(51) Int. Cl.
*H04L 29/08* (2006.01)
*H04L 29/06* (2006.01)

(52) U.S. Cl.
CPC .......... *H04L 67/1044* (2013.01); *H04L 67/42* (2013.01)

(58) Field of Classification Search
CPC ..................... H04L 67/1044; H04L 67/42
See application file for complete search history.

(56) References Cited

U.S. PATENT DOCUMENTS

| | | | | |
|---|---|---|---|---|
| 8,386,630 B1* | 2/2013 | Atzmon | ................ | H04L 65/605 455/41.2 |
| 2004/0122958 A1* | 6/2004 | Wardrop | ........... | G06F 17/30206 709/229 |
| 2010/0022231 A1* | 1/2010 | Heins | .................. | H04M 3/4872 455/418 |
| 2012/0221647 A1* | 8/2012 | Ciminiera | ............. | H04L 67/104 709/204 |
| 2013/0064370 A1* | 3/2013 | Gouge | ................ | H04L 63/0428 380/255 |
| 2013/0198151 A1* | 8/2013 | Sentinelli | .............. | H04L 1/0045 707/693 |
| 2013/0198804 A1* | 8/2013 | Asher | ..................... | H04L 29/06 726/3 |
| 2013/0346522 A1* | 12/2013 | Lennstrom | ............. | H04L 51/14 709/206 |

* cited by examiner

*Primary Examiner* — Philip J Chea
*Assistant Examiner* — Robert B McAdams
(74) *Attorney, Agent, or Firm* — Barry N. Young

(57) ABSTRACT

Optimized content sharing in an enterprise storage system using a content management system having an orchestration server to coordinate access by and sharing of content over a LAN directly between peer-to-peer end-user enterprise clients. Clients are connected in a peer-to-peer LAN network and organized into content sharing groups that are authorized to share particular content. Upon receiving a request from a client for content, the orchestration server identifies one or more other clients in the same content sharing group that have valid, current copies of the requested content, establishes trusted secure peer-to-peer communications using authentication tokens and URLs of the other clients to the content, and coordinates peer-to-peer transfer of the content over the LAN to the requesting client. For multiple clients with valid content, the orchestration server coordinates transfer to the requesting client using multiple threads.

16 Claims, 4 Drawing Sheets

SERVER-ORCHESTRATED PEER-TO-PEER CONTENT SHARING IN CMS AND SYNC-N-SHARE APPLICATIONS

BACKGROUND

This invention generally to the storage, management and sharing of data or content in enterprises and other large organizations.

Enterprises and other large organizations create, store and manage large amounts of data, frequently in a collaborative workflow environment, where the data must be created, managed, shared and used by different clients (end-users) of the enterprise. The data is typically stored, organized in and accessed from a centralized facility such as an enterprise data center or remotely from cloud storage. To facilitate content management and sharing, enterprises and organizations provide tools and capabilities such as content management systems (CMSs) tailored to manage, store and deliver content to internal organizations, users, and processes. Content management systems may be used to store and organize files, enforce access and security restrictions, and provide other functionality such as version control, indexing, searching and retrieval.

In a typical enterprise CMS, content is transferred from data storage by a content server (CS) to requesting end user client computers, and the data transfer is facilitated by an orchestration server (OS) acting as an orchestrator for operations on metadata and content. Frequently multiple users need to access and/or share the same content, especially in collaborative work environments, and frequently the shared content is quite voluminous, such as video or audio files, for instance. Thus, data transfer (download) of content from the data store to a requesting client and upload of any modified or changed content back to the data store may require significant resources and be very time-consuming. This can slow down enterprise operations when competing users and processes must access and share the same or other content. Sync-n-share systems where stored files are accessed, changed, synchronized and shared by multiple clients have similar problems as CMS systems.

It is desirable to provide content sharing systems and methods in CMS and sync-n-share systems, particularly for enterprises and other large organizations, that address the foregoing and other known problems of managing and sharing stored content in collaborative working environments by providing efficient mechanisms for accessing, sharing and managing such content. It is to these ends that the present invention is directed.

DESCRIPTION OF PREFERRED EMBODIMENTS

The invention is particularly adaptable to enterprise content management systems (CMSs) and to sync-n-share systems (collectively referred to herein as content management systems) used in collaborative work environments where content must be accessed and shared by multiple users, and will be described in that context. It will be appreciated, however, that this is illustrative of only one utility of the invention and that the invention is applicable to other types of systems and uses.

Prior to describing the invention, a typical CMS system and its operation will be described, as this will offer a better appreciation for the differences between known CMS systems and methods and the invention and the advantages that the invention offers.

Figure 1:
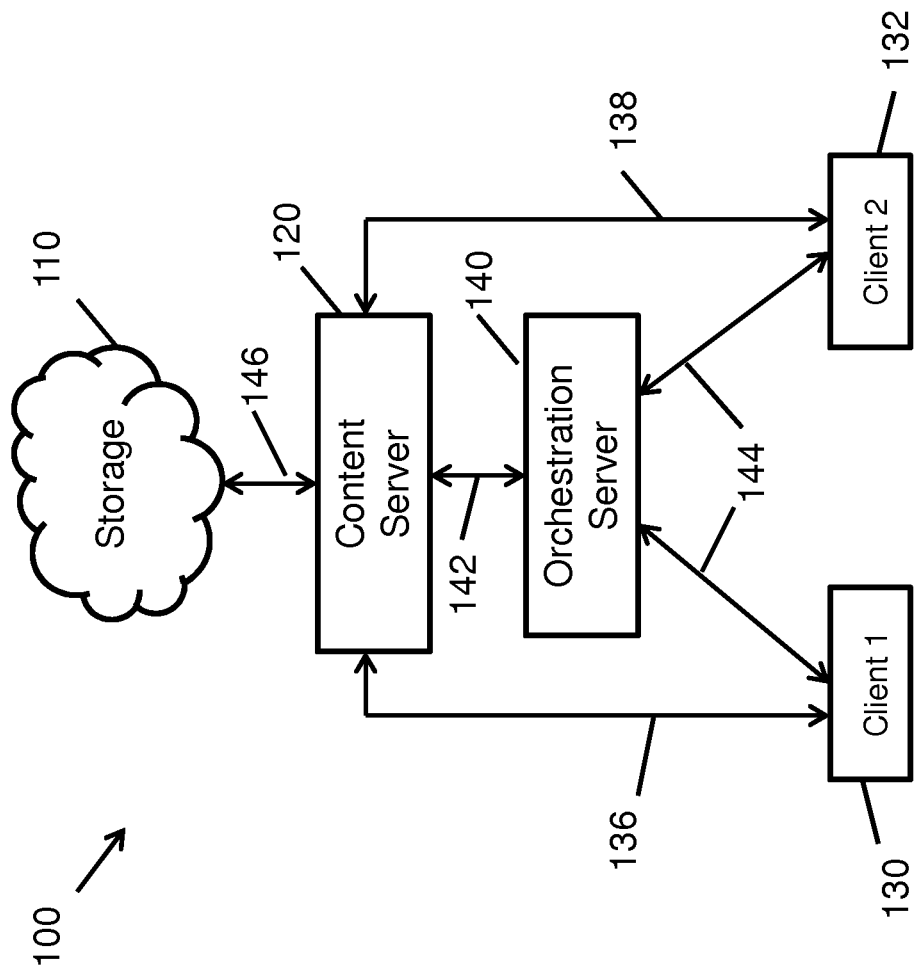
FIG. 1 is a block diagram of a typical known content management system.

FIG. 1 is a block diagram that illustrates the architecture of a typical CMS 100 such as may be used in an enterprise or other organization for managing the storage and transfer of content objects or data such as documents, videos, audios, etc., to multiple users. The content may be stored by the CMS in storage 110, which may comprise, for instance, a database system, an enterprise data center or cloud storage. The content may be stored in and accessed from the storage 110 by a content server (CS) 120 which may be part of the database system or in the data center where the content is stored. The CS transfers content to and from the storage to a plurality of end user client's 130, 132, such as Client 1 and Client 2 shown in the figure, via a network as indicated at 136 and 138. The CMS may further comprise an orchestration server (OS) 140, also referred to herein as an "orchestrator", which communicates with the CS via the network as indicated at 142 and with the clients as indicated at 144, to facilitate content transfer between the CS and the clients. The OS may also maintain content metadata and facilitate client transfers of content objects to and from storage. In some systems, the content server and the orchestration server may comprise computer executable instructions executing on the same or different computers, and in other systems the service may be separate standalone computer servers. The end user client's 130, 132 may be small intelligent client computers that have the capability to read/write to a client file system as well as to connect to the OS or the CS. In other cases, the end user clients may also run small embedded application servers.

Content management and sync-n-share systems of the type illustrated in FIG. 1 operate as follows. A client such as Client 1, 130 that wishes to access content, e.g., a document, file or data, first sends a request for the content via the network 144 to the orchestrator (OS) 140. The OS passes the request from Client 1 to the CS 120 via communication link 146. Before doing so, the OS may first verify the Client 1 is authorized to access the requested content. Upon receipt of the request from the OS, the CS prepares a URL to the location in storage 110 of the requested content, and returns the content URL via the communication link 142 to the OS. The orchestrator forwards the content URL received from the CS to the requesting Client 1 (130) via network 144. Upon receipt, Client 1, using the URL, requests the content from the CS 120 via the network 136. The CS responds to the request from the client by retrieving the requested content from storage 110 and streaming the content back to Client 1 view the network link 136. As indicated above, depending upon the size of the content requested, the download of the content from the CS to Client 1 may be very time-consuming.

Now, if Client 2, 132, wishes to access the same or other content from storage 110, or if Client 1, 130, wishes to access other content, the same steps as described above for Client 1 are repeated to satisfy these requests. As may be appreciated, if multiple ones of the plurality of clients request the same content, the same sequence of steps must be repeated multiple times. Not only does this require repeated uses of system resources to access the same content, it may also consume significant time to transfer the content because of network bandwidth limitations. This may, in turn, result in significant time delays in satisfying requests from other clients for content. Thus, particularly for large enterprises, a conventional CMS as shown and described in FIG. 1 may be quite inefficient and resource intensive.

The invention avoids these problems by providing a new and improved CMS architecture and process having a substantially more efficient, faster and optimum content transfer mechanism. As will be described in more detail below, in accordance with the invention, end user clients, in addition to being able to communicate with the OS and the CS, may be interconnected by a network, such as a LAN, and formed to communicate and transfer data between themselves in a peer-to-peer configuration. Groups of clients which are authorized to share content objects among themselves may be organized into sharing groups and registered with the CMS. Then, in accordance with the invention and its transfer mechanism, if one client of a content sharing peer group has desired content, other clients (peers) in the sharing group can obtain the content directly from that one client via a peer-to-peer transfer without the necessity of re-fetching the content from the CS. This can save significant amounts of time (sometimes, up to an order of approximately 90%), particularly when the content is large. Additionally, since it is not necessary to download the content from the CS, the CS is free to handle requests from other clients for other content, thereby optimizing and improving the overall transfer efficiency and speed of the system.

Figure 2:
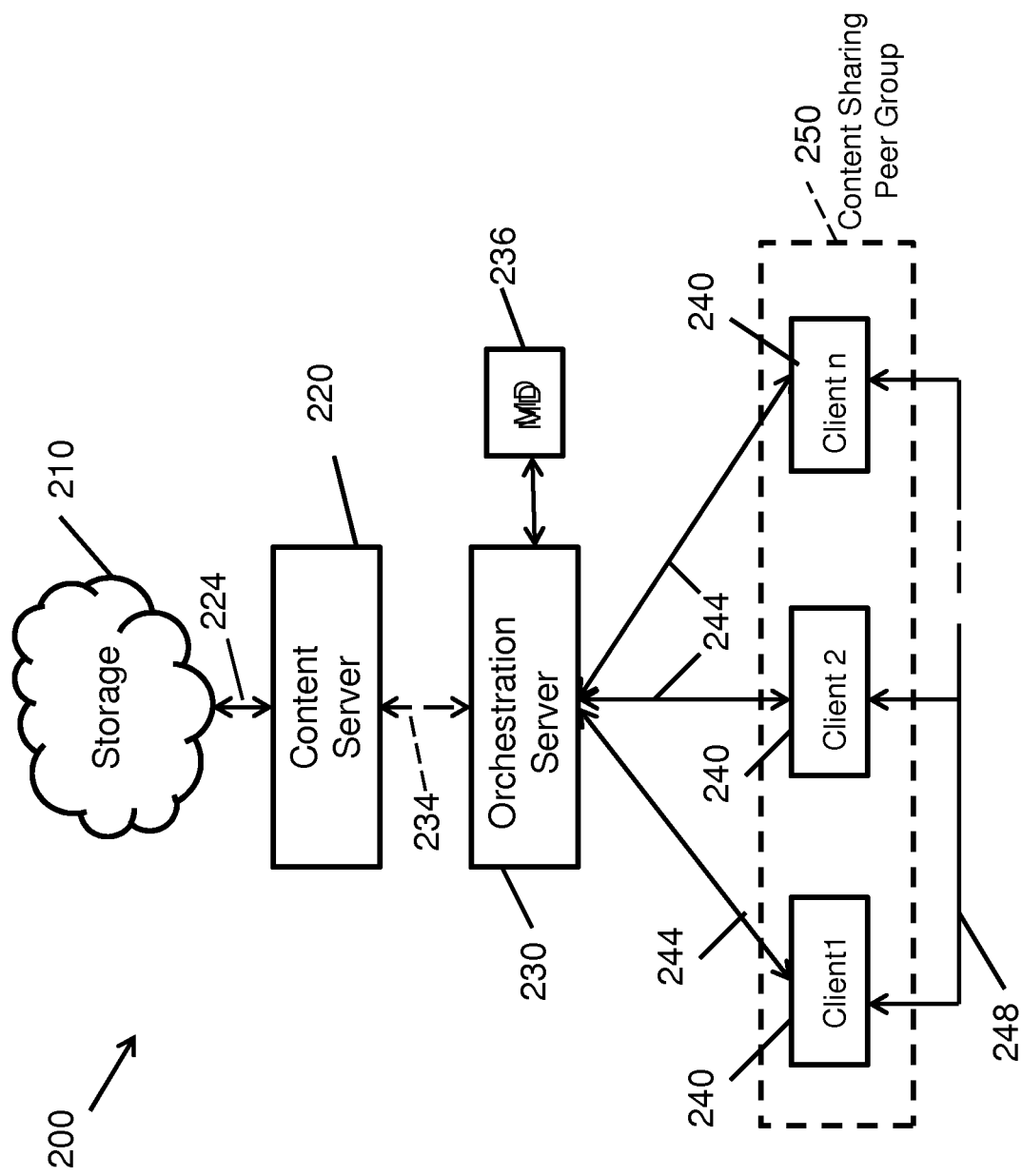
FIG. 2 is a block diagram of an embodiment of a content management system in accordance with the invention.

FIG. 2 illustrates the client-server architecture of a enterprise content management system 200 in accordance with an embodiment of the invention. As shown, the system 200 may comprise storage 210 for storing content such as documents, images, videos etc. Storage 210 may be a database system, a data center, or cloud storage, for instance. An advantage of storing and managing the content in a cloud is that the content it can be accessed from anywhere and its availability is improved. A content server (CS) 220 may manage the storage and transfer of content objects to and from storage 210 via a network communications link 224. The content server may be part of the storage system, or external to the storage system and connected by the communications link 224. An orchestration server (OS) 230, also referred to herein as an "orchestrator", may communicate with the content server 220 via a network communications link 234, and may communicate with a plurality of end user client computers 240, Client 1, Client 2 . . . Client n, via corresponding network communication links 244. The OS may have a memory 236 which stores content metadata and other information about content and clients 240, and may maintain in memory a Least Recently Used (LRU) record of the recent content object transfers between storage and clients. As will be described, the OS may coordinate and facilitate content transfer to and between the clients, and may perform other functions. The CS and the OS may comprise computer executable instructions (programs) executing on the same or different computers, or, in some embodiments, may be separate standalone computer servers and associated programs performing the functions described herein. The client computers may also comprise executable instructions that control the client computers to perform the functions described herein.

The client computers 240 may be connected by a network 248, such as a local area network (LAN), and may be formed for peer-to-peer communications among themselves over LAN 248. Additionally, the plurality of clients 240 may be organized into one or more content sharing peer groups 250 in which all of the clients in each peer group are authorized to share particular content among themselves. There may be a plurality of different content sharing peer groups, with the clients in each group having different security, access restrictions and privileges to access different content.

In an embodiment, the content sharing peer groups may be organized around particular sets of contents. The content accessible by end user clients who are peer members of a content sharing peer group may be based, for example, upon the type of content, the department within the enterprise which owns the content, the security restrictions applied to the particular content, or the types and roles of end user clients who are peer members of the particular content sharing peer group. End users (clients) may be members of more than one content sharing peer group depending upon their roles and responsibilities within the enterprise. Executive level management of the enterprise, for example, may have access to all content, whereas department level personnel may be restricted to access only content relevant to their particular department.

Client membership of a content sharing peer group, as well as access restrictions, may be set up by an administrator of the system, for example, based upon enterprise or other policies. Access to content may be coordinated and controlled by the orchestration server (OS) 230, which optimizes the download of and access to content. The OS may be used also to enforce content access restrictions among different clients and among the different content sharing peer groups. The OS may fetch from CS and maintain in its memory 236 lists of clients that are members of different content sharing peer groups and access restrictions on both clients and content. Moreover, since peer-to-peer communications are typically not secure, in a preferred embodiment the OS may establish secure trusted communications between peers and control access to content by using authentication tokens for security and to grant clients access to content, as described below in connection with FIG. 3.

Figure 3:
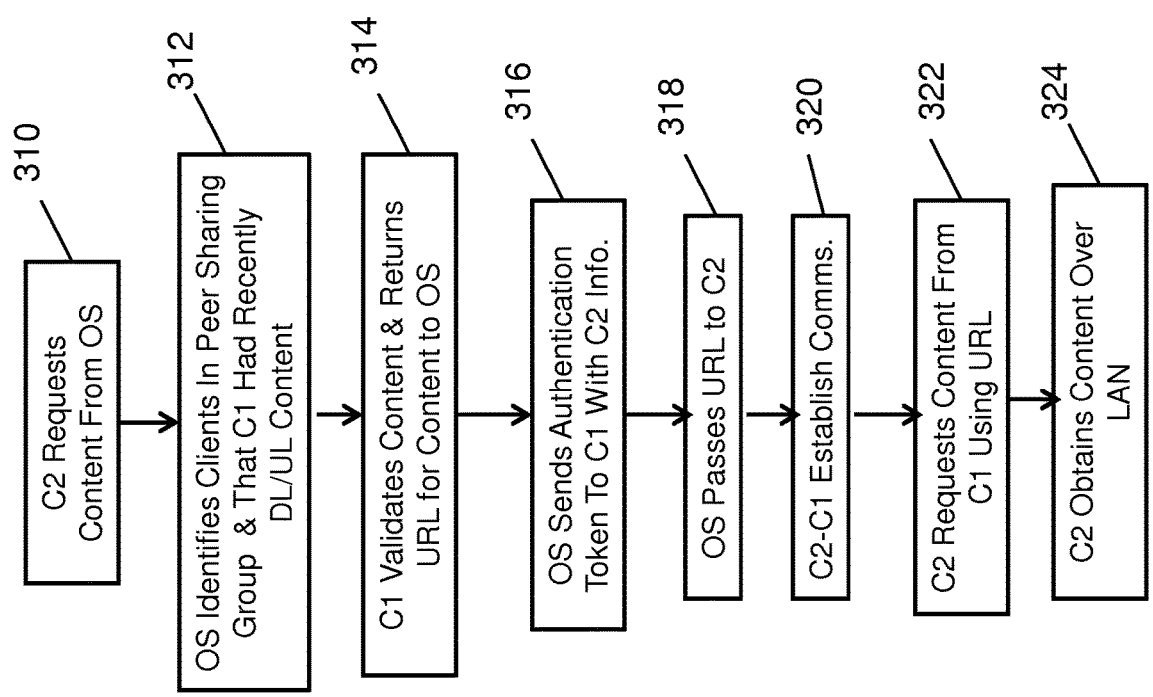
FIG. 3 is a diagrammatic view of an embodiment of a content management workflow process in accordance with the invention.

FIG. 3 illustrates an embodiment of a workflow process in accordance with the invention of the content management system illustrated in FIG. 2. As an overview of the process, whenever an end user client wishes to download or access content, the client sends a request for the content to the orchestrator 230. The orchestrator may then obtain a list of all the clients that are in the same content sharing peer group as the requesting client, and then determine whether any of the clients in the peer group already have the requested content because of a previous download. If a second corresponding client in the peer group already has the requested content, the OS may then determine whether that copy of the content from the previous download is valid and, if so, coordinate and authorize a peer-to-peer transfer of the requested content from the corresponding client having the content to the requesting client over the LAN. Since the peer-to-peer transfer is local between the two clients, the content server is not involved and it is free to handle other content transfers to or from storage, and use of the main network resources is unnecessary. This optimizes the download of and access to content in the system. If, on the other hand, the requested content is not available from another client in the content sharing peer group, or otherwise is not valid, the content may be downloaded directly from the content server to the requesting client in a manner such as described in connection with FIG. 1.

Referring to the workflow process of FIG. 3, assume that at 310 Client 2 (C2) requests content from the OS 230. At 312, the OS identifies other client members of the content sharing peer group from information stored in OS memory 236, and determines from the LRU record in the memory whether any of those clients have downloaded or uploaded the requested content. As noted above, the LRU record may comprise a list of recent downloads and uploads of content by clients. If at 312 the OS identifies Client 1 (C1) as being a member of the same content sharing peer group as C2 and as having recently downloaded or uploaded the requested content, the OS may request C1 to validate its copy of the content at 314 as by using registry information such as a checksum or hash of the content object file. C1 may validate its copy of the content at 314, and create and return to the OS a URL to the content. The OS may respond at 316 by passing an authentication/security token back to C1 with identification information such as the destination IP address and name of the requesting client C2, and by passing the URL to the content to C2 at 318. This OS to client connection is preferably persistent. To facilitate content hosting, either a TCP socket connection may be established between the clients or an embedded application server could be run on the clients. Clients C1 and C2 may establish trusted peer-to-peer communications between themselves at 320 using the security token, and C2 may request the content from C1 at 322 using the URL. At 324, C2 may obtain the requested comment by either eagerly copying or streaming it. Eagerly copying all the content rather than merely streaming it is preferable so that the content transfer will be more reliable by minimizing the need to retransfer the content in the event of a lost connection or a failure of a client.

Upon receiving access to requested content, the requesting client may simply use the requested content and store a copy in local memory. Otherwise, depending upon the privileges of the requesting client, the requesting client may modify or update the requested content and store the modified content in local memory, or coordinate through the orchestration server and the content server to replace the original content in storage with the modified content. In this case, the orchestration server may update the metadata in memory 236.

Figure 4:
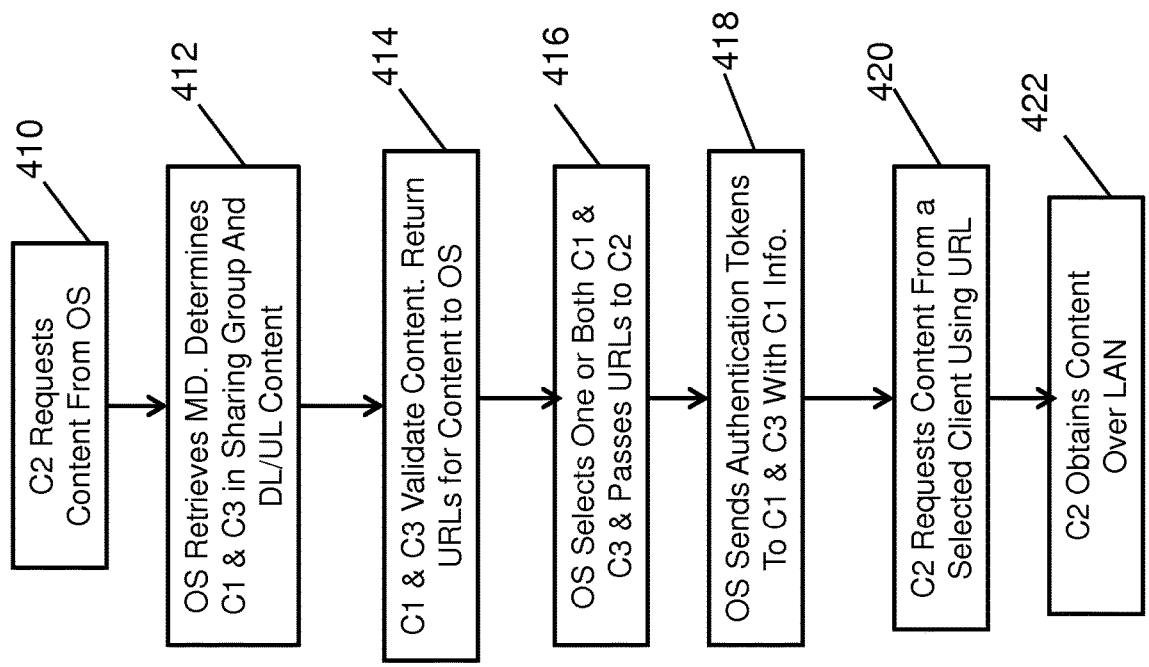
FIG. 4 is a diagrammatic view of another embodiment of a content management workflow process in accordance with the invention.

Although clients should be up and available all the time, the system needs to be able to deal with situations where a peer client is not available, or a file is unavailable or modified, or where a peer-to-peer connection between clients is unexpectedly terminated. FIG. 4 illustrates an alternative embodiment of the workflow process of FIG. 3 that can address these and other similar situations. The process of FIG. 4 is similar to that of FIG. 3, except that it identifies multiple clients in a content sharing peer group which have validated content, and facilitates trusted communications between the requesting client and one or more of the multiple clients from which the requesting client can obtain the desired content.

Referring to FIG. 4, at 410 client C2 may request content from the orchestration server 230. At 412, the OS may retrieve metadata from memory 236 and identify that clients C1 and C3 are members of the same content sharing peer group as client C2, and that C1 and C3 had recently downloaded or uploaded the requested content. At 414, clients C1 and C3 may validate that the content is current and return URLs for the content to the OS. At 416, the OS may select either or both C1 and C3, and pass the URLs to C2. At 418, he OS may send authentication tokens to C1 and/or C3 along with client C2 information. At 420, client C2 may request the content from either or both of clients C1 and C3 using the appropriate URLs, and at 422 may obtain the content over the LAN.

It is an advantage of the process of FIG. 4 that clients are able to supply or receive content to or from multiple other clients and in multiple threads. In the event a transfer of content to or from one client is interrupted, it may be resumed with another client, which affords better availability and reliability. Additionally, the OS may split the content file into chunks and use multiple clients to supply the file to one or more client receivers, possibly by determining the geolocation of the clients and favoring nearer clients. Splitting a content file into chunks is particularly advantageous where the content file is a large file. Each client in a content sharing peer group which downloads a complete file may become a new source of the file to satisfy future requests, which affords redundancy and greater reliability.

As will be appreciated from the foregoing, the invention also solves a problem with managing and synchronizing content in systems which have many content users in a team, as well as where one user which has multiple devices on which the user wishes to download the content, and it is also applicable to sync-n-share systems. Unlike conventional CMS systems, such as shown and described in FIG. 1, or conventional sync-n-share systems, the invention's use of an orchestration server that maintains cognizance of content users and exercises control and coordination of content and sharing among users is very different from known systems, and is an advantage in that it affords the tighter control on content and content sharing that is necessary in enterprises. Moreover, the sharing of content in a secure, controlled peer-to-peer environment as is afforded by the invention is particularly advantageous in optimizing the transfer and sharing of content among end users in enterprises.

While the foregoing has been with reference to particular embodiments of the invention, it will be appreciated that changes to these embodiments may be made without departing from the principles and the spirit of the invention, the scope of which is defined by the appended claims.

The invention claimed is:

1. A method of managing and sharing content among end-user clients in an enterprise content management system, the content being stored in and retrieved from enterprise storage by a content server computer of the system, comprising:

organizing said clients into one or more content sharing groups, wherein the clients in each group are authorized to access and share designated content to the exclusion of non-authorized clients of other sharing groups, said clients being connected together by a network for peer-to-peer communications between said clients;

receiving by an orchestration server of the system a request from a first client for access to particular requested content stored in said enterprise storage;

identifying by the orchestration server a second client and a third client that have a copy of the requested content and that the second and the third clients are members of the same content sharing group as the first client and authorized to share said requested content;

validating that the copies of the requested content of the second and the third clients are current and valid, and upon validating that said copies of said requested content of said second and third clients are current and valid providing to the first client URLs to said copies of said requested content of the second and third clients to establish peer-to-peer transfers over the network of the requested content to the first client, wherein said second and said third clients transfer their respective copies of the requested content to the first client using different processing threads.

2. The method of claim 1, wherein said identifying comprises maintaining by the orchestration server a record of recent downloads and uploads by clients of the requested content.

3. The method of claim 1, wherein said validating comprises validating that said second and third clients' copies of the requested content are current and valid using content metadata stored in a memory of the orchestration server.

4. The method of claim 3, wherein said validating comprises comparing a checksum or a hash of said copies to said metadata.

5. The method of claim 1, wherein said coordinating comprises sending by the orchestration server to the second and third clients authentication tokens and information about the first client, receiving URLs to the copies of said requested content from the second and third clients, and forwarding the URLs to the first client to establish said peer-to-peer communications with the second and the third clients.

6. The method of claim 5, wherein said authentication tokens establish trusted secure communications between said clients, and the first client obtains said requested content from the second and third clients via said trusted secure communications over the network.

7. Non-transitory computer readable media storing executable instructions for controlling a computer system to perform a method of managing and sharing content among end-user clients in an enterprise content management system, the content being stored in and retrieved from enterprise storage by a content server computer of the system, said method comprising:
organizing said clients into one or more content sharing groups, wherein the clients in each group are authorized to access and share designated content to the exclusion of non-authorized clients of other sharing groups, said clients being connected together by a network for peer-to-peer communications between said clients;
receiving by an orchestration server of the system a request from a first client for access to particular requested content stored in said enterprise storage;
identifying by the orchestration server a second and a third client that have a copy of the requested content and that the second and the third clients are members of the same content sharing group as the first client and authorized to share said requested content;
validating that the copies of the requested content of the second and the third clients are current and valid, and upon validating that said copies of said requested content of said second and third clients are current and valid providing to the first client URLs to said copies of the requested content of the second and third clients to establish peer-to-peer transfers over the network of the requested content to the first client, wherein said second and said third clients transfer their respective copies of the requested content to the first client using different processing threads.

8. Non-transitory computer readable media of claim 7, wherein said identifying comprises maintaining by the orchestration server a record of recent downloads and uploads by clients of the requested content.

9. Non-transitory computer readable media of claim 7, wherein said validating comprises validating that said second and third clients' copies of the requested content are current and valid using content metadata stored in a memory of the orchestration server.

10. Non-transitory computer readable media of claim 9, wherein said validating comprises comparing a checksum or a hash of said copies to said metadata.

11. Non-transitory computer readable media of claim 7, wherein said providing comprises sending by the orchestration server to the second and third clients authentication tokens and information about the first client, receiving URLs to the copies of said requested content from the second and third clients, and forwarding the URLs to the first client to establish said peer-to-peer communications with the second and the third clients.

12. Non-transitory computer readable media of claim 11, wherein said authentication tokens establish trusted secure communications between said clients, and the first client obtains said requested content from the second and third clients via said trusted secure communications over the network.

13. A system for managing and sharing content among end-user clients in an enterprise, the content being stored in and retrieved from enterprise storage by a content server computer, comprising:
a plurality of end-user clients organized into one or more content sharing groups, each of the clients in each group being authorized to access and share designated content to the exclusion of non-authorized clients of other sharing groups, the clients being connected together by a network for peer-to-peer communications; and
an orchestration server connected to said content server and to said plurality of clients, the orchestration server having a memory storing metadata about said content and information about said clients and said content sharing groups; the orchestration server being formed to:
(i) respond to a request from a first client for access to particular requested content by verifying that the first client is authorized to access the requested content and identifying from said metadata and said information a second client and a third client of the same content sharing group as the first client that have a copy of the requested content and are authorized to share said requested content;
(ii) validate that the copies of the requested content of the second and the third clients are current and valid by comparing a checksum or a hash of said copies to the metadata in said memory;
(iii) provide to the first client information as to locations of said copies of the requested content of the second third clients; and
(iv) provide said location information to the first client to establish secure peer-to-peer communications between the first and the second and third clients for transfer of the requested content over the network to the first client, wherein said second and said third clients transfer their respective copies of said requested content to the first client using different processing threads.

14. The system of claim 13, wherein said orchestration server coordinates said secure peer-to-peer communications between the first client and the second and third clients by forwarding authentication tokens to the first client and information about the second and third clients for use in establishing said secure peer-to-peer communications.

15. The method of claim 1, wherein said validating the copies of the requested content comprises validating by said second and third clients their respective copies, and said providing comprises providing said URLs by said second and third clients.

16. The method of claim 1, wherein said respective copies of the requested content transferred to the first client are duplicate copies.

* * * * *